United States Patent [19]
Schiel

[11] Patent Number: 5,208,955
[45] Date of Patent: May 11, 1993

[54] ROLL

[75] Inventor: Christian Schiel, Heidenheim, Fed. Rep. of Germany

[73] Assignee: J.M. Voith GmbH, Fed. Rep. of Germany

[21] Appl. No.: 855,273

[22] Filed: Mar. 23, 1992

[30] Foreign Application Priority Data

Apr. 12, 1991 [DE] Fed. Rep. of Germany ....... 4111911

[51] Int. Cl.⁵ .................... B21B 27/06; B60B 19/10
[52] U.S. Cl. ........................ 492/12; 165/89; 492/46; 492/45
[58] Field of Search ............ 29/112, 113.1, 113.2, 29/116.1, 116.2, 117, 114, 126, 132, 129; 165/89

[56] References Cited

U.S. PATENT DOCUMENTS

| 1,820,074 | 8/1931 | Kilborn | 29/112 X |
| 2,908,486 | 10/1959 | Thornburg | 165/89 |
| 3,633,663 | 1/1972 | Tafel | 165/89 |
| 3,802,495 | 4/1974 | Hordis | 165/89 |
| 5,011,401 | 4/1991 | Sakurai et al. | 29/132 X |

FOREIGN PATENT DOCUMENTS

| 1070127 | 5/1960 | Fed. Rep. of Germany . |
| 2706850 | 9/1977 | Fed. Rep. of Germany . |
| 3146320 | 11/1981 | Fed. Rep. of Germany . |
| 1152979 | 5/1969 | United Kingdom . |

Primary Examiner—Timothy V. Eley
Assistant Examiner—C. Richard Martin
Attorney, Agent, or Firm—Baker & Daniels

[57] ABSTRACT

A roll, specifically a paper machine press roll, with a hollow rotatable roll body features a roll shell and on at least one of its two ends a hollow roll journal. A guide body which is stationary or fastened to the roll body extends through the interior of the roll body and forms with the roll shell a channel system through which a tempering medium flows. For purposes of using air as tempering medium, a pressure blower and/or a suction blower are connected to the channel system. The channel system and the blower(s) are so dimensioned that an air flow velocity above 10 m/sec will materialize in the channel system.

9 Claims, 2 Drawing Sheets

ROLL

BACKGROUND OF THE INVENTION

The invention concerns a roll, preferably a paper machine press roll, which together with a backing roll forms a press gap, and which features a tempering device. A roll of this general type is known from DE-OS 27 06 850.

The tempering device provided in the interior of such a roll serves preferably to cool the roll shell, however it can also serve to supply heat to the roll shell. The known roll requires a cooling because it is part of a metal continuous casting system. Similar rolls serve as press rolls in papermaking machines. Here, a problem results from the fact that press rolls of that type are provided on their outer shell surface with an elastomer coating. During the roll operation together with the backing roll, heat occurs in the elastomer coating due to the inner flexing work of the elastomer taking place in the area of the press gap, which heat needs to be removed continuously. In this context, allowance must be made for the fact that rolls of that type are used in a 24-hour continuous operation and that in modern papermaking machines ever further increases of the operating speed and contact pressure are sought after.

In the prior rolls, the tempering device is of a design such that cold water flows along the inside circumference of the roll shell, absorbing heat and leaving the roll again at elevated temperature. The following problem occurs in the process: Conditioning the cooling water so that it will have the required low temperature and the purity necessary for continued operation causes high costs. As a further aggravation, the cooling water, despite careful conditioning, can chemically attack the inside surface of the roll shell in a nonpredictable way, due to its content of oxygen and/or aggressive ingredients (for instance humic acids). This may be the cause of oscillation crack corrosion and, following thereof, an unexpected break of the roll. On some prior rolls, this risk is avoided by using oil as cooling medium. However, the costs for conditioning the oil are still higher than those for conditioning of cooling water. Therefore, oil cooling pays only in rolls with adjustable flexure, where the oil can at the same time serve to transfer the press force from the roll shell to a fixed bending axle.

The problem underlying the invention is to advance a roll of the type described in such a way that the tempering (mainly the cooling) of the roll shell will be possible at an expense lower than before, and that in doing so the risk of oscillation crack corrosion will be avoided.

SUMMARY OF THE INVENTION

This problem is solved through the features of the present invention. A primary feature of the invention constitutes the use of air as the tempering medium, and dimensioning the channel system (existing between the inside surface of the roll shell and the guide body) along with the blower(s) in such a way that an air flow velocity above 10 m/sec, preferably between 20 and 50 m/sec, will adjust in the channel system.

The inventor has recognized that under the just mentioned conditions a high heat transfer from the roll shell to the air or vice versa takes place, and at that, due to a very large air amount flowing through the roll interior and due to the relatively high heat transfer index. The advantages of using air as tempering medium are constituted by the fact that air is available in unlimited quantities and can be conditioned at low expense (for instance by means of a simple filter) and that air will to a considerably smaller extent than water, or not at all, chemically attack the inside surface of the roll shell. Therefore, oscillation crack corrosion can be avoided at a probability bordering on certainty.

The channel system of the present invention (an provided between the inside of the roll shell and the guide body) may in the simplest case be an annular space, specifically if the guide body has mainly a cylindrical shape. However, the guide body may also feature longitudinal ribbing or similar spacer elements. In this case, the channel system is formed by a number of channels extending preferably in axial direction.

Previously known from DE-OS 1 070 127 is a socalled expander roll coolable by means of air and serving the guidance and spreading (i.e. broadside stretching) of webs, for instance paper webs. Thus, this roll does not interact with a backing roll. Its roll shell is composed of a tubular elastic rubber or plastic shell in which several support bushings are inserted which in longitudinal direction are arranged successively. Each support bushing rests by means of two antifriction bearings on a stationary bent axle. As opposed to it, the inventional roll is a press roll which (as already mentioned above) forms together with a backing roll a press gap and which features a self-supporting roll body; this means that the roll body is supported only on its two ends by means of a bearing each (for instance in a machine frame or in swivel levers). The roll body is comprised (as initially already mentioned) of a roll shell and, at each roll end, a hollow roll journal which with its outside rests in one of said bearings. Thus, the interior space of the roll body is free of installations serving to support the roll body. Consequently, essentially the entire interior space of the roll body is available for a (stationary or concomitantly rotating) air guide body.

Besides, much greater flow cross sections can be provided for the tempering air; thus it is possible to pass at relatively higher air flow velocities and lower expense considerably greater air amounts through the roll body than possible in the case of the aforementioned DE-PS 1 070 127. As compared to it, the heat transfer from the roll shell to the air (or vice versa) can thus be considerably increased. Only then does it become possible, for instance when the press roll features an elastomer coating, to continuously remove the high amounts of heat which in the operation of the press roll are generated through the flexing work taking place inside the elastomer coating.

The roll body may in known fashion be composed of the roll shell and of two hollow roll journals bolted to it which, among others, serve to support the roll. In this case, the guide body will normally be inserted in the interior of the roll before the hollow roll journals are bolted to the shell. In many cases, however, using a one-piece roll body is given preference, as is known from the initially cited DE-OS 27 06 850. According to this publication, the guide body is made first and serves then as a core in casting the roll body. In other words: the roll body is cast around the guide body and remains thereafter on it.

This complex fabrication process is avoided according to an important constructive idea of the invention. When a one-piece roll body is to be provided it is made first without the guide body, with the outside and inside diameters of the hollow roll journals, the same as heretofore, being smaller than the outside and inside diameters of the roll shell. Besides, the guide body is so fashioned that in an only partially prefabricated condition it can be introduced through one of the hollow roll journals into the interior of the roll body and only then be completely assembled.

BRIEF DESCRIPTION OF THE DRAWINGS

Various embodiments and further favorable developments of the invention will be described hereafter with the aid of the rolls illustrated pictorially.

DESCRIPTION OF THE PREFERRED EMBODIMENT

Figure 1:
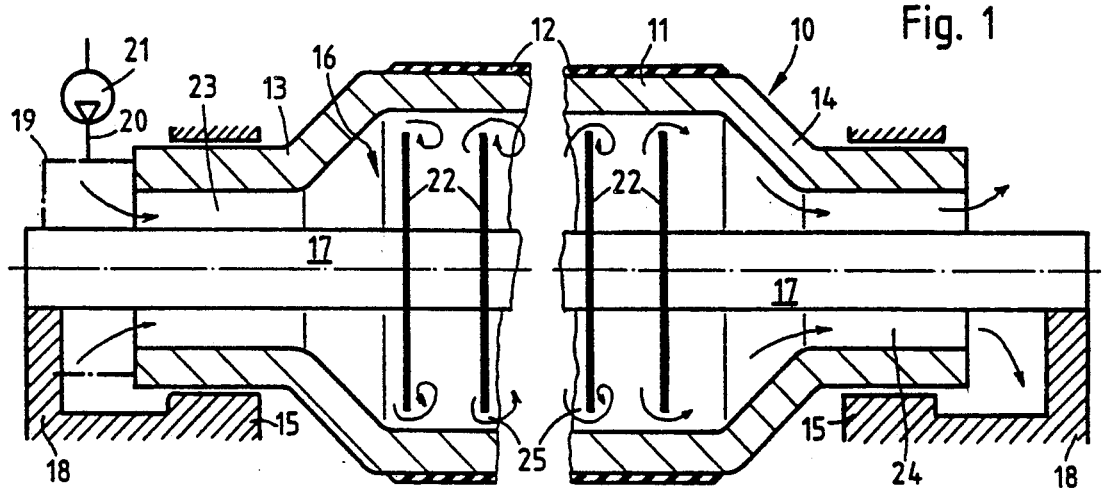
FIG. 1 shows a longitudinal section through a roll with a stationary guide body (featuring disks)

The roll illustrated in FIG. 1 (schematically and simplified) is a press roll for a papermaking machine. A rotatable roll body referenced 10 overall comprises a roll shell 11 with an elastomer coating 12 (for instance of polyurethane) and two hollow roll journals 13, 14. The latter have outside and inside diameters smaller than the roll shell 11; they have therefore a conic area by which they are connected with the roll shell 11. Illustrated in all of the FIGS. 1, 2, 3, 5 and 7 is a one-piece roll body. But the invention is applicable also with multiple part roll bodies where the roll journals are bolted to the roll shell.

The roll body 10 is rotatably supported by bearings 15. Referenced 16 overall, a guide body comprises in FIG. 1 a stationary support body 17 extending through the interior of the rotatable roll body and resting outside it on supports 18. The bearings 15 and supports 18, in turn, rest on a not illustrated foundation, machine frame or similar.

Connected with the support body 17 and support 18 is a stationary air supply housing 19, which is illustrated only schematically and into which empties the pressure line 20 of a blower 21. Remaining between the support body 17 and the hollow roll journals 13, 14 are annular spaces 23, 24 through which the supplied air flows. Several disks 22 are arranged successively on the support body in axial direction. Their outside diameter is by a certain amount smaller than the inside diameter of the roll shell 11, so that the air flows at a high velocity above 10 m/sec (preferably between 20 and 50 m/sec) through the annular gaps 25 remaining between the disks 22 and the inside surface of the roll shell. Besides, the disks 22 create (as illustrated by arrows) a turbulent condition of flow. Fashioned this way, the tempering device is especially suited for cooling the roll shell 11 and the elastomer coating 12, which operationally heats up through flexing work. The air supplied by means of the blower 21, therefore, is preferably cold air taken in, e.g., from the open or air cooled by means of a cooling device. The annular gaps 25 form a "channel system".

The roll body may feature an elastomer coating also in the other FIGS. 2 through 4, and 7, but it is not illustrated in these figures. The invention is applicable also in the case of rolls featuring no elastomer coating.

In this case it is possible to supply warm air to the tempering device, for instance to avoid a "sweating" of the roll shell on its inside surface, thereby counteracting corrosion. Rolls of that type can be used as well in papermaking or paper processing machines, especially in the dryer section or in a paper coater.

Figure 2:
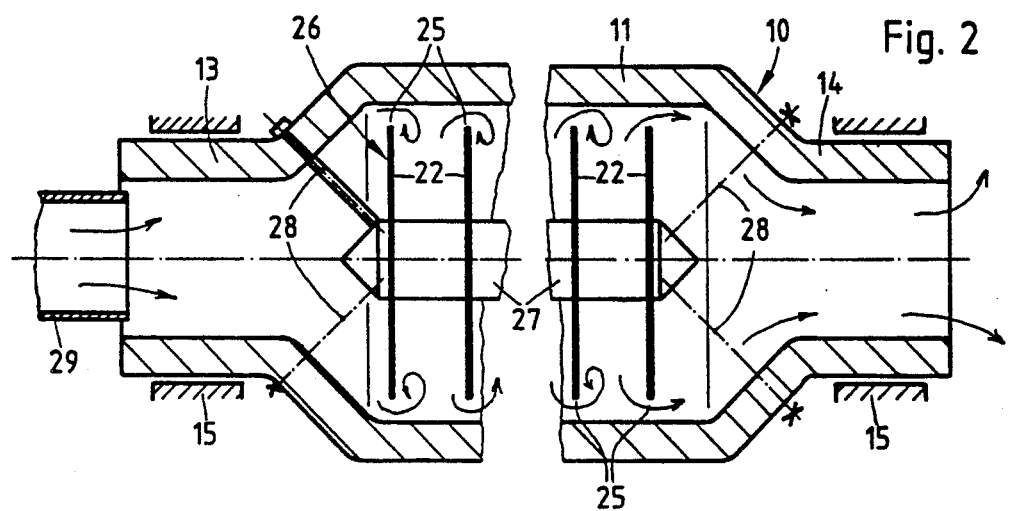
FIG. 2 and 3 show a longitudinal section each through a roll with a rotating guide body.

The roll illustrated in FIG. 2 differs from that according to FIG. 1 primarily in that instead of a stationary guide body there is a guide body 26 provided which rotates with the roll body 10. Said guide body is composed of a support body 27 which to the roll body 10 is coaxial and preferably tubular while preferably bolted to the hollow roll journals 13, 14 by means of support elements 28 (for instance bolts) arranged slanted relative to the axis, along with again several disks 22. These, the same as in FIG. 1, are mounted on the support body 27 and form with the inside surface of the roll shell 11 a series of annular gaps 25. The supply of air takes place through a stationary tube 29 and through the one hollow roll journal 13, while the removal of the air takes place through the other hollow roll journal 14.

Figure 3:
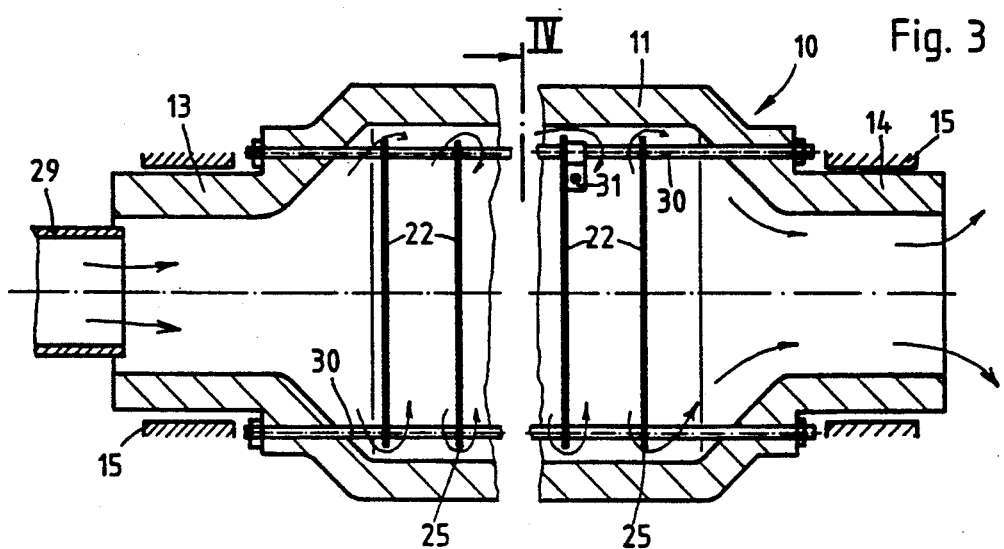
Figure 4:
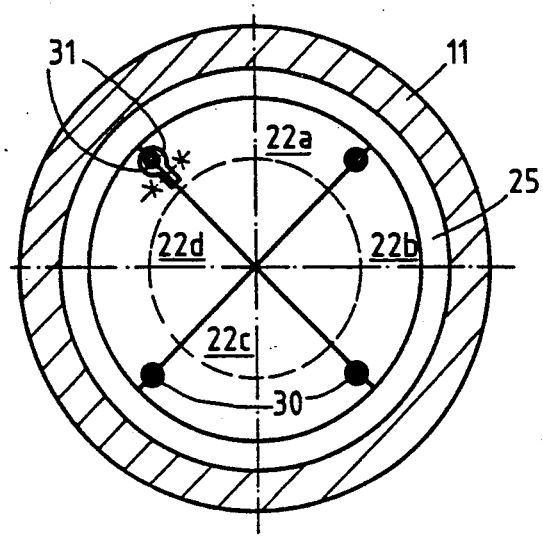
FIG. 4 shows a cross section along line IV in FIG. 3.

According to FIG. 3 and 4, the disks 22 are mounted on several bars 30 of axially parallel arrangement, extending from the one roll journal 13 to the other roll journal 14. FIG. 4 shows that each of the disks 22 may be subdivided in segments 22a through 22d, for instance in four segments. These segments can individually be introduced in the interior of the roll body 10 and can be clamped there (for instance by means of hose clamps 31 welded in place) to the bars 30. Such subdivision of the disks 22 is a prerequisite for fashioning the roll body 10 as a one-piece component and, e.g., fabricating it by casting.

Figure 6:
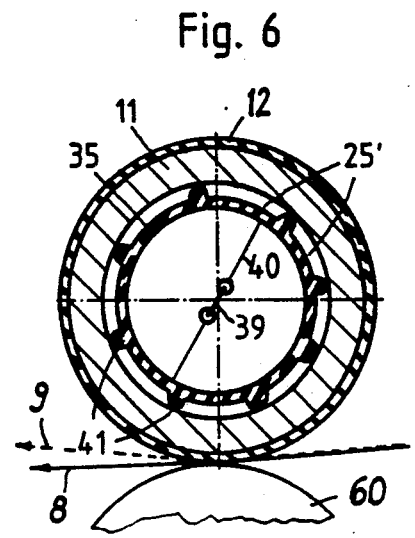
FIG. 6 shows a cross section along line VI in FIG. 5.
Figure 5:
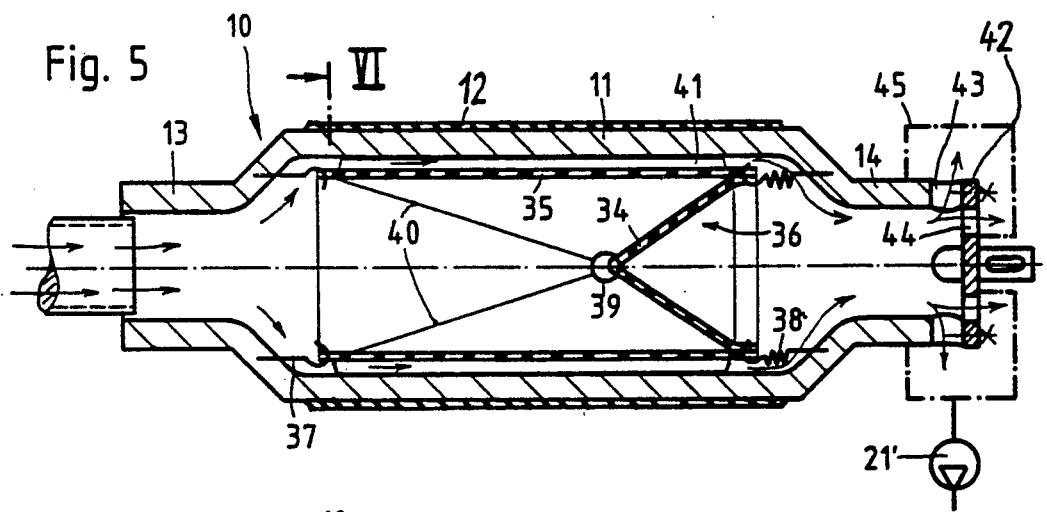
FIG. 5 shows a longitudinal section through a further embodiment with rotating guide body.

FIG. 5 and 6 show another embodiment with a one-piece rotatable roll body 10 where, however, entirely different means make sure that the guide body 36 can be introduced through one of the two hollow roll journals 13, 14 into the interior of the roll body and mounted there on it. The guide body 36 has in this case the shape of a hose 35 with a cone-shaped bottom 34. Hose 35 and bottom 34 are made of a flexible material allowing their introduction in folded state in the interior of the roll body 10. FIG. 5 shows that inside the roll body there are eyelets 37 and eyelets with tension springs 38 arranged, with which the hose 35 is mounted in the roll body in a way such that it will form an essentially cylindrical guide body 36. It goes without saying that for this purpose there are a number of eyelets 37, 38 distributed across the circumference. A ring 39 is inserted in the point of the cone-shaped bottom 34. Thus, the bottom 34 can as well be tensioned on the eyelets 37 by means of cables 40. The point of the cone-shaped bottom 34 faces preferably toward that roll end (roll journal 13) through which the influx of air takes place. To ensure a uniform spacing between the hose 35 and roll shell 11, spacer elements 41 (for instance knobs or ribs) may be molded or fastened to the outside of the hose 35 which, as the hose is spreading, bear on the inside surface of the roll shell. Channels 25' remain between the spacer elements, forming the channel system.

FIG. 6 also shows (exemplary for all embodiments of the invention) that the press roll forms with a rotatable backing roll a press gap through which runs, for instance, a still moist paper web 9 along with a dewatering felt 8. The purpose of this is to press water out of the paper web.

In FIG. 5, a drive flange 42 is mounted on the outer end of the hollow roll journal 14, for driving the roll body 10. Air passage openings 43, 44 are provided partly in the roll journal 14 and partly in the drive flange 42. Schematically indicated is a stationary air discharge box 45 which with openings 43, 44 envelopes the roll end and to which a suction blower 21' is connected. However, the air feed through the roll may take place also in the opposite direction.

Figure 7:
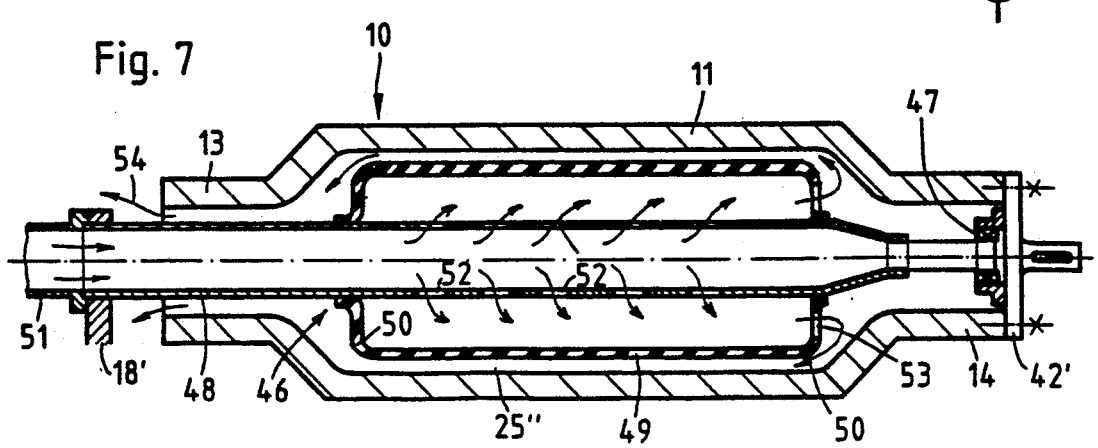
FIG. 7 shows a longitudinal section through a further embodiment with a stationary guide body.

FIG. 7 shows a further embodiment with a stationary guide body 46 which rests on one roll end in a support 18' arranged outside the roll body, and on the other end in a bearing 47 which bears, e.g., in a drive flange 42'. The guide body 46 comprises a (for instance tubular) support body 48 and, fastened to it and fashioned of a flexible material, a hose 49 which on both of its ends is connected with the support body 48 through flexible end walls 50. An air supply line 51 connects to the outer end of the support body 48. Numerous air passage openings are provided in the part of the support body 48 enveloped by the hose 49. Air discharge openings 53 are provided in one of the two flexible end walls 50 of the hose 49, but in a small number as compared to the air passage openings 52 provided in the support body 48.

If such a guide body 46 according to FIG. 7 is to be combined with a one-piece roll body 10, the outside diameter of the tubular support body 48 must be smaller than the inside diameter of at least one of the hollow roll journals 13, 14. This makes it possible to introduce the support body 48 along with the hose 49 attached to it, but the latter still in folded condition, through the hollow roll journal into the interior of the roll. Next, the hose 49 is inflated by means of the air supplied through the support body 48 and the openings 52. Upon discharge (through the openings 53) from the interior of the hose 49, the air is deflected; it flows thereafter at first through the annular space 25" and along the inside surface of the roll shell 11, thereafter in the same direction outward (air discharge 54). Hence, the arrangement must always be such that the air discharge openings 53 will be arranged on one roll end and the air discharge 54 from the roll body on the other roll end. Deviating from FIG. 7, the air passage openings 53 of the hose 49 could be arranged on the influx end. In this case, air discharge openings would need to be provided in the area of the drive flange 42 (as illustrated in FIG. 5 at 43, 44). The support body 46 also may be varied to the effect that its mounting on the roll body 10 will not be stationary but similar to FIG. 2. Spacer elements may again be provided on the outside of the hose 49, as illustrated in FIG. 5 and 6 at 41.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A roll for forming a press gap with a backing roll, said roll comprising:
    a hollow rotatable roll body having two ends and featuring a roll shell, said roll body including a hollow roll journal at each end thereof, said roll shell and said hollow roll journals defining a one-piece roll body, each of the hollow roll journals and the roll shell having respective inside diameters wherein the inside diameters of the hollow roll journals are smaller than the inside diameter of the roll shell;
    a guide body extending through the interior of said roll body, said guide body being one of stationary and fastened to said roll body, said guide body being formed of a flexible material, said guide body further being sized and configured to be inserted through one of said hollow roll journals and expanded to a cylindrical body inside the roll body, said guide body and said roll shell defining a channel system through which operationally flows a tempering medium; and
    blowing means operatively connected to said channel system for supplying said tempering medium; said channel system and said blowing means being dimensioned so that when air is said tempering medium the air may flow through said channel system at a velocity of more than 10 m/sec.

2. The roll of claim 1, wherein said blowing means is at least one of a pressure blower and a suction blower.

3. The roll according to claim 2, wherein said channel system and said blower are dimensioned so that said air flow velocity is between 20 and 50 m/sec.

4. The roll of claim 2, in which the outside surface of the roll shell features an elastomeric coating, and wherein the temperature of the air supplied as tempering medium is lower than the temperature of the roll shell during operation as the roll forms a press gap with the backing roll.

5. The roll of claim 2, wherein each of said hollow roll journals rests in a bearing, said roll body being self-supporting.

6. The roll of claim 1, wherein said guide body is provided with a bottom, which bottom is tensioned on the roll body with the aid of tension elements.

7. The roll of claim 6, wherein said bottom is generally cone-shaped.

8. The roll of claim 7, wherein the point of said generally cone-shaped bottom is directed against the air flow.

9. The roll of claim 6, wherein said guide body is tensioned in axial direction with the aid of tension springs.

* * * * *